W. GARDINER.
STORAGE BATTERY.
APPLICATION FILED MAY 22, 1915.

1,213,182.

Patented Jan. 23, 1917.

Witnesses:
Robert H. Weir
Arthur W. Carlson

Inventor
William Gardiner
By Charles C. Bulkley
Attys

UNITED STATES PATENT OFFICE.

WILLIAM GARDINER, OF CHICAGO, ILLINOIS.

STORAGE BATTERY.

1,213,182.  Specification of Letters Patent.  Patented Jan. 23, 1917.

Application filed May 22, 1915. Serial No. 29,896.

*To all whom it may concern:*

Be it known that I, WILLIAM GARDINER, a citizen of the United States of America, and resident of Chicago, Cook county, Illinois, have invented a certain new and useful Improvement in Storage Batteries, of which the following is a specification.

My invention relates to storage batteries or accumulators and the like, and has more particular reference to improvements in the electrolyte therefor and the process of making same, together with the protection of said electrolyte while in the cell and the maintenance of its proper operative condition and efficiency.

A further object of my invention is to provide an electrolyte for storage batteries which will be of such nature and consistency that when used in batteries which are subjected to agitation and jarring it will not splash out or become displaced.

The accompanying drawing illustrates a storage battery embodying my invention.

Figure 1:
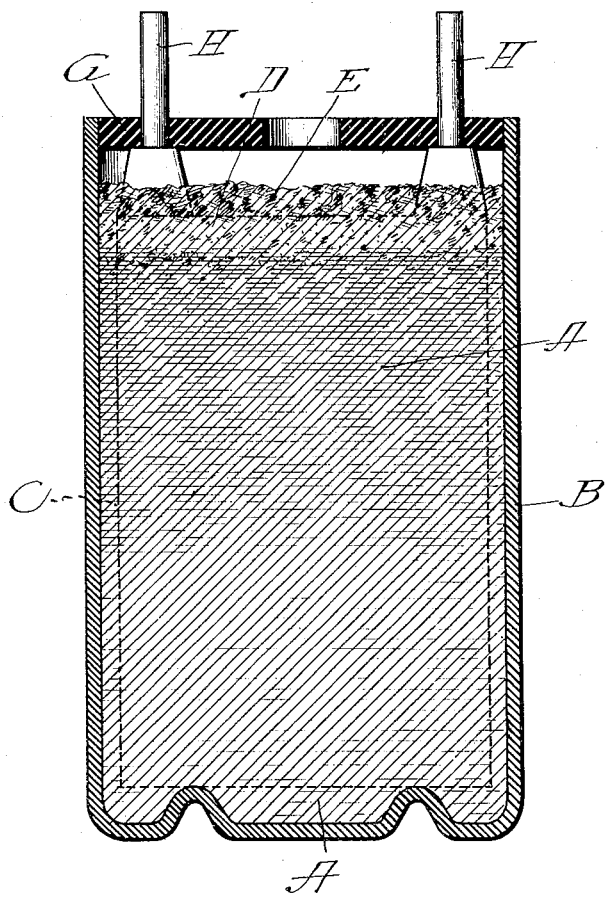
Figure 2:
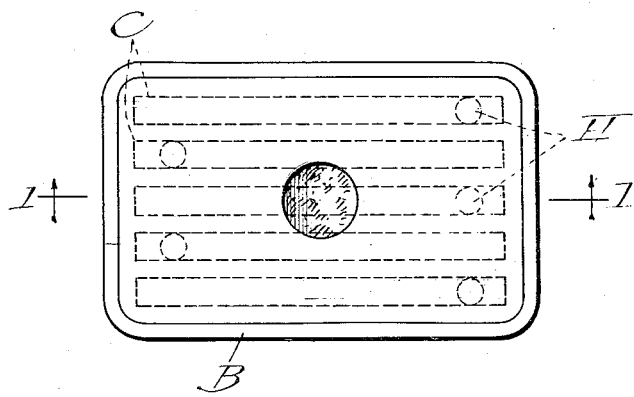

In the drawing: Figure 1 is a vertical section of said storage battery on the line 1—1 of Fig. 2; and Fig. 2 is a top plan view of said storage battery.

In carrying out my invention, I make a solution of sulfuric acid and water preferably in the proportions which are usual in the ordinary sulfuric acid and water solution used in storage batteries, such, for instance, that at about 60° F. it will test about 1.300 specific gravity. The acid is preferably introduced into the water in order to prevent undue heating, and the solution is then allowed to cool. This solution, of course, is in liquid form and flows as free as water. To this solution I add another solution consisting of water, sodium silicate or silicate of soda, and infusorial earth. This solution is composed of the three above-mentioned ingredients, preferably in the following proportions: one-half pint of water, two ounces of sodium silicate, and from four to eight ounces of infusorial earth, this solution being added to about one gallon of the sulfuric acid and water solution. The second mentioned solution is preferably made independently of the first or sulfuric acid and water solution, and the two are then mixed or combined together at the proper time—that is, after the sulfuric acid and water solution is cooled. In actually bringing together these two solutions, I prefer to introduce the first or sulfuric acid and water solution into the second solution, rather than the second solution into the first, for the reason that if the second solution were introduced into the first solution, the second solution would immediately congeal or become a mass and would not properly mix or combine with the first solution. After the solutions are combined, the combined solution is preferably allowed to stand for a period of from eight to twelve hours or longer if desired, and during this period the entire solution will gradually congeal and form a more or less elastic mass. For this reason I prefer to place the combined solution, which is indicated at A in the drawing, while still in liquid condition directly in the cell in which it is to be used and allow it to congeal or thicken in the cell. This cell or receptacle B is of any suitable or usual type for the purpose. The structure shown is rectangular in form and open at its top.

After the battery plates, which are designated as C and which may be of suitable or usual type, have been placed in proper position and properly arranged in the cell or receptacle B, the combined solution A is poured into the cells around the plates until the cell is filled to the proper point, and while in this cell it is allowed to stand. Thus the solution while in liquid condition enters into intimate relation to the plates and then congeals or masses in this condition. In the combined solution, the infusorial earth has the effect of preventing in the course of time the cracking or splitting or turning to scale of the silicate of soda, and the entire mass will remain practically in its original congealed condition without shrinkage and without structural change.

Evaporation would necessarily change the proportions of the water to the other substance in a solution of this character and would have an effect on the efficiency of the solution; but in order to maintain the proper proportion of water, I provide means which in a sense is a cover for the solution which will automatically supply moisture to the substance. I provide a thin layer of suitable material D upon the top of the solution, and as material for this purpose I prefer to use granulated or comminuted cork. In order to render the cork impervious or proof against the action of the sulfuric acid in the solution, I first treat the cork with a solution of potash and water. This solution of potash and water should be made of such density as to preferably test about 1.100 specific gravity and constitutes, in a sense, a bath into which the particles of cork are immersed. After being treated in this manner, the cork is then immersed, or otherwise treated, in a solution of sulfuric acid and water which tests about 1.250 specific gravity. The action of this latter solution of sulfuric acid and water is to neutralize the potash with which the cork was previously treated, and after the potash is neutralized in this manner the treated cork is then washed in clear water. The treatment of the cork in this manner renders it proof against the action of sulfuric acid in the battery solution above described. Any suitable manner of associating the cork with the solution may be employed; for instance the treated cork may, if desired, be mixed with the main solution while said main solution is in liquid form and before it congeals, and by reason of its lesser specific gravity it will rise to the top and form a layer at the top of the battery solution before or by the time that the solution sets or becomes congealed. Again the treated cork may be placed in a layer above the solution after said solution is hardened. The former method of introducing the treated cork into the solution while in liquid form is preferable because the particles of cork then receive a coating, so to speak, of the solution itself, which coating will congeal and cause the particles to adhere to some extent and form a sort of unitary or compact layer at the top of the solution. This layer of cork while forming a protecting cover above the solution is at the same time porous, so that the hydrogen and other gases given off during the charging of the battery may readily pass therethrough in the same manner as in an ordinary cell. The moisture for the solution is automatically maintained by providing a layer above the cork of some material, preferably absorbent material E, which will hold in suspension a quantity of water or moisture with which it is soaked. The material which I have found best adapted for this purpose is asbestos, and preferably the so-called "Swedish" asbestos. This asbestos is placed in a layer above the cork and preferably in contact therewith and is then soaked with water. The water in the asbestos is thus absorbed by the electrolyte through the layer of cork and at the same time the asbestos is protected from the action of the sulfuric acid in the electrolyte by the layer of cork.

At their upper edges the plates may have shoulder lugs F upon which a cover G for the cell may be supported. Rising from the lugs F there may be extensions H forming terminal lugs for the plates and by which electrical connections may be made therewith. The bottom of the cell or receptacle may have ribs J formed in its bottom, which serve as supports for the plates to keep them off the bottom of the cell.

In accordance with my invention, the electrolyte is in a sense solid and integral with the plates and other parts of the battery, and although the battery may be subjected to severe jars or shocks, the solution will not become displaced or reduced in quantity by splashing or otherwise. In practice, it is necessary to moisten the asbestos occasionally, otherwise no other care of the battery is necessary.

What I claim as my invention is:

1. The composition of matter consisting of sulfuric acid, sodium silicate, infusorial earth and water.

2. The herein described composition of matter consisting proportionately of a solution of sulfuric acid and water of about 1.300 specific gravity, and a solution of one-half pint of water, two ounces of sodium silicate and from four to eight ounces of infusorial earth.

3. A non-flowing electrolyte for storage batteries consisting of sulfuric acid, water, sodium silicate and infusorial earth in combination.

4. In a storage battery, a non-flowing electrolyte, comprising a congealed solution of sulfuric acid, sodium silicate, infusorial earth and water, a porous layer of material thereon superposed on and in intimate contact with said electrolyte, and a quantity of absorbent material on said porous layer.

5. An electrolyte for storage batteries consisting of sulfuric acid and water of about 1.300 specific gravity, infusorial earth and sodium silicate all consolidated together in a congealed mass of the consistency of jelly.

Signed by me at Chicago, Illinois, this 17th day of May, 1914.

WILLIAM GARDINER.

Witnesses:
M. HAMILTON,
E. H. CLEGG.